United States Patent
Akella et al.

(10) Patent No.: US 11,513,519 B1
(45) Date of Patent: Nov. 29, 2022

(54) SHARING OCCLUSION DATA

(71) Applicant: Zoox, Inc., Foster City, CA (US)

(72) Inventors: Abishek Krishna Akella, Pleasanton, CA (US); William Anthony Silva, San Francisco, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 409 days.

(21) Appl. No.: 16/562,311

(22) Filed: Sep. 5, 2019

(51) Int. Cl.
    *G05D 1/00* (2006.01)
    *G05D 1/02* (2020.01)

(52) U.S. Cl.
    CPC ......... *G05D 1/0088* (2013.01); *G05D 1/0276* (2013.01); *G05D 2201/0213* (2013.01)

(58) Field of Classification Search
    CPC ............. B60W 30/09; B60W 2420/42; B60W 30/18163; B60W 2554/00; G05D 1/0088; G05D 1/0212; G05D 1/0214; G05D 1/0257; G05D 1/0221; G05D 1/0278
    See application file for complete search history.

(56) References Cited

U.S. PATENT DOCUMENTS

| | | | | |
|---|---|---|---|---|
| 2019/0019416 A1* | 1/2019 | Perko | .................. | G05D 1/0088 |
| 2019/0064840 A1* | 2/2019 | Becker | ................. | G01S 13/931 |
| 2019/0065864 A1* | 2/2019 | Yu | .......................... | G06V 20/56 |
| 2019/0088142 A1* | 3/2019 | Kotteri | ................ | B60W 30/165 |
| 2019/0370569 A1* | 12/2019 | Gulati | ..................... | G01S 17/46 |
| 2020/0130685 A1* | 4/2020 | Nguyen | ............... | G05D 1/0088 |
| 2020/0193812 A1* | 6/2020 | Morris | ................. | G08G 1/0112 |

FOREIGN PATENT DOCUMENTS

WO    WO2022009707 A1    1/2022

\* cited by examiner

*Primary Examiner* — Calvin Cheung
(74) *Attorney, Agent, or Firm* — Lee & Hayes, P.C.

(57) ABSTRACT

Techniques are discussed for controlling a vehicle, such as an autonomous vehicle, based on occluded areas in an environment. An occluded area can represent areas where sensors of the vehicle are unable to sense portions of the environment due to obstruction by another object or sensor limitation. An occluded region for an object is determined by the vehicle as part of an occlusion grid, from the perspective of the vehicle. The vehicle may receive another occlusion grid from another source, such as another vehicle or a remote computing device that stores and distributes occlusion grids. The other occlusion grid may be from a different perspective than the occlusion grid generated by the vehicle, and may include occupancy data for the region that is otherwise occluded from the perspective of the vehicle. The vehicle can be controlled to traverse the environment based on the occupancy data received from the other source.

21 Claims, 7 Drawing Sheets

SHARING OCCLUSION DATA

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. However, conventional techniques for making such decisions may rely upon limited information, which may cause actions performed by the autonomous vehicle to be uncertain, erratic, and/or overly cautious.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
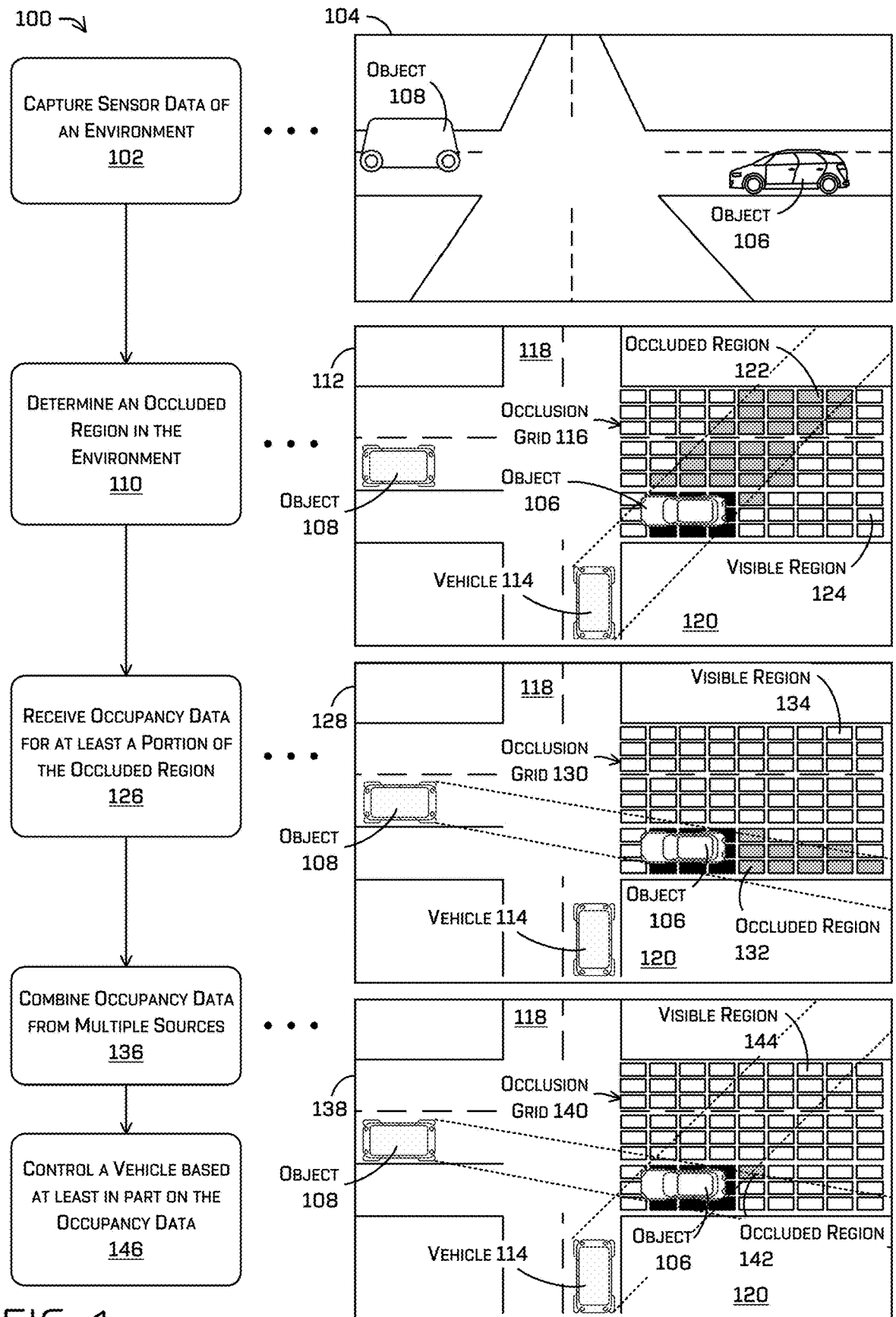
FIG. 1 is a pictorial flow diagram of an example process for capturing sensor data, determining an occluded region in the environment, receiving occupancy data for at least a portion of the occluded region, combining occupancy data from multiple vehicles, and controlling a vehicle based at least in part on the occupancy data, in accordance with examples of the disclosure.

This disclosure is directed to receiving shared information about an area that is not detectable or otherwise visible to sensors of a vehicle (e.g., an occluded region) to improve the vehicle's understanding of the occluded region. For example, the techniques described herein can receive, from another vehicle and/or a computing device remote from the vehicle, an occlusion grid corresponding to at least a portion of a region of an environment that is occluded to the vehicle (e.g., in which sensor information is unavailable due to, for example, geometric occlusions). The occlusion grid may comprise a plurality of occlusion fields which can represent discrete areas of the environment, where individual occlusion fields may indicate an occlusion state (e.g., indicating whether the location is visible to one or more sensors of an autonomous vehicle) and an occupancy state (e.g., indicating whether the location is occupied by an object such as a vehicle, pedestrian, animal, etc.). The occlusion state and/or the occupancy state can be determined using lidar data, radar data, time of flight data, and/or image data captured by the vehicle(s), or in some examples, captured by sensing devices throughout the environment (e.g., on buildings, traffic signs, bicycles, pedestrian devices, and the like). The received occlusion grid may be combined with an occlusion grid generated by the vehicle, such that the vehicle can generate a more complete picture of the environment and proceed through the environment based on what is known about the occluded region.

Techniques for generating an occlusion grid are discussed herein. Additional details for generating an occlusion grid can be found for example, in U.S. patent application Ser. No. 16/011,436 titled "Occlusion Aware Planning" and filed Jun. 18, 2018, which is incorporated by reference herein in its entirety.

For example, first vehicle (e.g., an autonomous vehicle) may capture sensor data as the vehicle traverses an environment. Sensor data captured by the vehicle can include lidar data, radar data, image data (RGB, intensity, depth, infrared, ultraviolet, etc.), time of flight data, sonar data, and the like. In some cases, the sensor data can be provided to a perception system configured to determine a type of an object (e.g., vehicle, pedestrian, bicycle, animal, parked car, tree, building, and the like) in the environment. When the first vehicle is at a particular location, the first vehicle may encounter any number of occluding objects that prevent sensors of the vehicle from sensing the environment. For instance, a parked car may occlude the first vehicle's view of a crosswalk where pedestrians are likely to cross a street, or a semi-truck may obstruct a view of one or more traffic lanes on a highway, to name a few examples. However, an occlusion reasoning system of the first vehicle may determine information about an occluded region using information about the occluded region corresponding to a different perspective than the perspective of the first vehicle.

To obtain such information, the occlusion reasoning system of the first vehicle may receive information about the occluded region from a second vehicle, or from a computing device remote from the first vehicle that aggregates information about the environment from different perspectives, for instance. In some examples, the information about the occluded region may include an occlusion grid that indicates occupancy states for discrete areas of the environment that are otherwise occluded to the first vehicle, but are unoccluded from the perspective of the second vehicle or sensors disposed throughout the environment. The occlusion reasoning system of the first vehicle may combine the occupancy data with an occlusion grid generated by the occlusion reasoning system to determine how to proceed through the environment.

Combining occupancy data for occluded regions may improve driving outcomes by increasing a certainty at which an autonomous vehicle proceeds through an environment. In some examples, an autonomous vehicle may increase an assertiveness (e.g., reduce hesitancy) at which the autonomous vehicle proceeds through the environment when provided with occupancy data from one or more other sources. For instance, the autonomous vehicle may increase its speed to proceed through a junction and/or assume a stop position closer to the junction when occupancy data is provided to the autonomous vehicle indicating that the junction is clear of other vehicles and/or pedestrians.

Additionally, in some examples, occupancy data may be received from other sources, such as another vehicle, by instructing the other vehicle to move to obtain information about an occluded region of the environment. For instance, a first vehicle may transmit a request for information about an occluded region in the environment to any number of vehicles in a surrounding area (e.g., within 10 meters, within 20 meters, within 50 meters, etc.). The first vehicle may receive a response from a second vehicle that the second vehicle is nearby, but does not have a line of sight to the occluded region and/or does not have an improved perspective of the occluded region beyond the view of the first vehicle. In response, the first vehicle may instruct the second vehicle to alter the trajectory of the second vehicle in order to obtain additional information about the occluded region. The second vehicle may follow the altered trajectory, generate occupancy data about at least a portion of the region that is occluded to the first vehicle, and transmit the occupancy data back to the first vehicle. The first vehicle may combine the occupancy data with an occlusion grid generated by the first vehicle to determine how to proceed through the environment, as described above and below.

The techniques discussed herein can improve a functioning of a computing device in a number of ways. As mentioned above, the occlusion reasoning system may combine occupancy data from multiple different perspectives into a single occlusion grid and consequently may execute decisions earlier than techniques that require all regions to be visible to a single vehicle, thus saving processing and computing resources in analyzing the surrounding environment. In some cases, the dynamic nature of the described techniques (e.g., controlling the vehicle based in part on occupancy data received from multiple sources from different perspectives) require fewer rules to be enumerated for generating and/or selecting trajectories for vehicles such as autonomous vehicles to traverse an environment. By controlling the vehicle based in part on occupancy data supplied from multiple perspectives, the safety of the vehicle can be improved by allowing the vehicle to adapt and react to its surroundings, rather than requiring the vehicle to follow set instructions, especially when a situation arises in which there is not a specific rule present. Further, controlling the vehicle based in part on occupancy data supplied from multiple perspectives can reduce processing resources, as the number of enumerated rules for every driving situation the vehicle may encounter would be virtually infinite. Further, techniques for designating visible regions of occluded regions based on shared occupancy data can increase a confidence that another object may not interfere or collide with a vehicle, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication of whether it is safe to perform various maneuvers. In another example, the techniques can be utilized in an aviation or nautical context, or in any system involving objects or entity that may be associated with behavior that is unknown to the system. Additionally, the techniques described herein can be used with real data (e.g., captured using sensor(s)), simulated data (e.g., generated by a simulator), or any combination of the two.

FIG. 1 is a pictorial flow diagram 100 of an example process for capturing sensor data, determining an occluded region in the environment, receiving occupancy data for at least a portion of the occluded region, combining occupancy data from multiple vehicles, and controlling a vehicle based at least in part on the occupancy data, in accordance with examples of the disclosure.

At operation 102, the process can include capturing sensor data of an environment. In some examples, the sensor data can be captured by one or more sensors on a vehicle (autonomous or otherwise). For example, the sensor data can include data captured by one or more of a lidar sensor, a radar sensor, an image sensor, a time of flight sensor, a sonar sensor, and the like. The operation 102 can additionally include accessing map data representing the environment.

An example illustrates image data 104 captured in the operation 102. For example, the image data 104 can represent an object 106 and an object 108 in the environment. In some examples, the object 106 and/or the object 108 can represent a vehicle, a pedestrian, an animal, and the like. In some instances, the sensor data captured in the operation 102 can be used to determine information about the object 106 and/or the object 108, including but not limited to, a type of the object (e.g., semantic information indicating a classification of the object, such as a vehicle, pedestrian, bicycle, animal, and the like). In some instances, the operations can include determining the type of the object 106 and/or the object 108, a bounding box associated with the object 106 and/or the object 108, segmentation information associated with the object 106 and/or the object 108, and/or movement information associated with the object 106 and/or the object 108, and any uncertainties associated therewith, as discussed herein. Although not expressly pictured in the pictorial flow diagram 100, stationary objects such as buildings, bridges, tunnels, and the like may be detected as well, such as from map data accessed by a vehicle.

At operation 110, the process can include determining an occluded region in the environment. The terms "occluded" and "visible" as used herein may represent a probability that the areas of the environment are occluded and/or visible to sensors (e.g., above a threshold). An example 112 illustrates a vehicle 114 that has approached a junction where the object 106 and the object 108 are present. In examples, the vehicle 114 may be a vehicle that captured the image data 104. The vehicle 114 may represent an occluded area of the environment using an occlusion grid 116, which may be stored in connection with map data of the environment, or can be dynamically generated based on objects in the environment, given sensor ranges, fields of view, and/or the map data. The occlusion grid 116 can include a plurality of occlusion fields (e.g., the boxes pictured in the occlusion grid 116), which can represent discrete areas of the environment, such as drivable regions. In some examples, an occlusion field can indicate an occlusion state (e.g., indicating whether the location is visible to one or more sensors of an autonomous vehicle) and an occupancy state (e.g., indicating whether the location is occupied by an object such as a vehicle, pedestrian, animal, etc. or is otherwise indeterminate). The occlusion state and/or the occupancy state can be determined using lidar data, radar data, and/or image data captured by the vehicle 114.

Additional details for generating an occlusion grid can be found for example, in U.S. patent application Ser. No. 16/011,436 titled "Occlusion Aware Planning" and filed Jun. 18, 2018, which is incorporated by reference herein in its entirety.

For the purpose of discussion, the vehicle 114 and/or the object 108 capturing (or utilizing) the sensor data can be autonomous vehicles configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 114 and/or the object 108 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 114 and the object 108 are described throughout this disclosure.

As noted above, the object 106 is also located in the environment, as shown in the illustrated example 112. In some examples, the object 106 can represent a vehicle, a pedestrian, a bicycle, an animal, and the like. The environment illustrated in the example 112 can include a drivable region 118 and a non-drivable region 120. In some examples, the drivable region 118 can include any area of an environment where the vehicle 114 can (legally) traverse (e.g., a road, a driveway, a parking lot, etc.). In some examples, the non-drivable region 120 can represent areas of an environment where the vehicle 114 cannot legally or physically traverse (e.g., a sidewalk, a building, a park, etc.).

In some examples, the occlusion grid 116 can be based at least in part on localizing the vehicle 114 in the environment and accessing map data associated with the environment. For example, map data can comprise map elements such as lane elements indicating a region of the environment corresponding to the drivable region 118. Additional examples of map elements can include, but are not limited to, one or more of a building or structure, a crosswalk element, a bike lane element, an intersection element, a lane divider element, a traffic light element, a stop sign element, a stop line element, a yield sign element, a yield line element, a parking lane element, a driveway element, a speed bump element, jaywalking regions (e.g., a virtual crosswalk), trajectory waypoints (e.g., known trajectories), passenger pickup points, a sign location element, a geofence element, and the like. In some cases, a predicted trajectory associated with an object can be based on the map data.

As mentioned above, the occlusion grid 116 can represent an occlusion state and/or an occupancy state for the occlusion fields of the occlusion grid 116. Additionally, in some examples, the occupancy state may further comprise an "indeterminate" state, which is to say that, based on the available data, it may be currently unknown whether the occlusion field is occupied or not. An indeterminate state may be caused, for example, by an object that obstructs a portion of the environment from view of the sensors of the vehicle 114, such as the object 106. In the example 112, occlusion fields of the occlusion grid 116 that are obstructed (occluded) by the object 106 are colored light gray, indicating an occluded region 122. Occlusion fields of the occlusion grid 116 that are occupied are colored black (e.g., at least partially covered by the object 106). Occlusion fields of the occlusion grid 116 colored white indicate a visible region 124, which is visible from a perspective of the vehicle 114 at a current location of the vehicle 114.

At operation 126, the process can include receiving occupancy data for at least a portion of the occluded region. In examples, the occupancy data may be included as part of an occlusion grid generated by another vehicle or other sensor disposed in the environment, and output for use by other vehicles to assist with traversing the environment. For instance, an example 128 illustrates the environment depicted in the example 112, but in this instance, an occlusion grid 130 represents an occluded area of the environment from the perspective of the object 108. Similar to the occlusion grid 116, the occlusion grid 130 can represent an occlusion state and/or an occupancy state for the occlusion fields of the occlusion grid 130, and in some examples, may also comprise an indeterminate state. In the example 128, occlusion fields of the occlusion grid 130 that are obstructed (occluded) by the object 106 are colored light gray, indicating an occluded region 132. Occlusion fields of the occlusion grid 130 that are occupied are colored black (e.g., at least partially covered by the object 106). Occlusion fields of the occlusion grid 130 colored white indicate a visible region 134, which is visible from a perspective of the object 108 at a current location of the object 108.

The object 108 may generate the occlusion grid 130 and transmit the occlusion grid 130, either directly or indirectly, to the vehicle 114. For instance, the object 108 may transmit the occlusion grid 130 directly, from one vehicle to another, using Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables communication between computing devices of the respective vehicles. In some examples, the vehicle 114 may send a request to the object 108 for occupancy data based on the determination of the occluded region in operation 110. Having the vehicle 114 send a request to the object 108 for the occupancy data may, in some cases, reduce an amount of data sent over a network. Alternatively or additionally, the object 108 may broadcast the occupancy data to other vehicles and/or computing devices in the area (e.g., including the vehicle 114) without necessarily receiving a request for the occupancy data. Broadcasting the occupancy data to devices in the area may reduce processing time for the vehicle 114 to make a determination on occupancy of the occluded region 122, thus allowing the vehicle 114 to make trajectory determinations faster and with more confidence.

In some cases, the object 108 may transmit the occlusion grid 130 to a remote computing device (e.g., a server computing device) that is configured to store and distribute occlusion grids and/or occupancy data amongst vehicles based on location, time, connectivity, and the like, as appropriate. The remote computing device may then distribute the occlusion grid 130 to the vehicle 114 responsive to a request from the vehicle 114 (e.g., as a result of determining the occluded region in operation 110), or may proactively distribute the occlusion grid 130 to the vehicle 114 based on a known location of the vehicle 114 in the environment without receiving a request. Similar to the discussion above, the vehicle 114 may communicate with the remote computing device to receive the occlusion grid 130 using Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables communication between computing devices.

At operation 136, the process can include combining occupancy data from multiple sources. In some examples, the occupancy data may be combined from multiple vehicles present in an environment at a similar time (e.g., within 5 seconds, 10 seconds, 30 seconds, one minute, etc.). An example 138 illustrates the environment depicted in the examples 112 and 128, with occupancy information from the occlusion grid 116 (generated by the vehicle 114) combined with occupancy data from the occlusion grid 130 (generated by the object 108), thus forming an occlusion grid 140. The occlusion grid 140 can represent an occlusion state, an occupancy state, and/or an indeterminate state for the occlusion fields of the occlusion grid 140 based on combining such data from the occlusion grid 116 with the occlusion grid 130. In the example 138, the occlusion field of the occlusion grid 140 that is obstructed (occluded) by the object 106 from the combined perspectives of the vehicle 114 and the object 108 are colored light gray, indicating an occluded region 142. Occlusion fields of the occlusion grid 140 that are occupied are colored black (e.g., at least partially covered by the object 106). Occlusion fields of the occlusion grid 140 colored white indicate a visible region 144, which is visible when the perspectives of the vehicle 114 and the object 108 are combined at the current locations of the vehicle 114 and the object 108. The vehicle 114 may combine the occlusion grid 116 and the occlusion grid 130 using, for example, a Kalman filter, sensor fusion, a probability density function, and/or other techniques for combining occlusion-related data. In some examples, the vehicle 114 may combine the occlusion grid 116 and the occlusion grid 130 to reduce an uncertainty associated with the occlusion grid 116 and/or the occlusion grid 130.

In some examples, occupancy data received from other sources may be assigned an uncertainty based on factors such as a time that the occupancy data was generated (e.g., based on a time stamp included in the occupancy data), types and/or accuracy of sensors used to generate the occupancy data, an amount of time that the object 108 has observed the region (e.g., a longer observation time may correspond to more accurate occupancy data), an amount of the occluded region 122 included in the occupancy data, and so forth. For instance, as a duration between the object 108 generating the occlusion grid 130 and the vehicle 114 receiving the occlusion grid 130 increases, the occupancy data included in the occlusion grid 130 may be assigned higher uncertainty values. Thus, the object 108 generating the occlusion grid 130 and the vehicle 114 receiving the occlusion grid 130 may, in some cases, not necessarily be collocated. For example, the vehicle 114 may receive the occlusion grid 130 from the object 108 as the object 108 passes through the junction (or otherwise passes through the portion of the environment where the vehicle 114 is located) and use the occlusion grid 130 even though the object 108 is no longer present, and down-weight the information received from the object 108 based on how recently the object 108 was present at the location of the vehicle 114 and generated/transmitted the relevant occlusion grid 130.

In this example, after a threshold amount of time (e.g., the occlusion grid 130 being received more than 3 seconds, more than 5 seconds, more than 30 seconds, etc. after being generated), the occluded region 122 may be indicated again with an occluded state rather than a part of the visible region 134, as the uncertainty associated with the occluded region 122 increases with time. In some examples, the uncertainty associated with occupancy data may be determined by applying a cost function to the occupancy data, where the cost function is applied to one or more of a time that the object 108 was at location in the examples 112, 128, and/or 138 and generated the occlusion grid 130, an amount of the occluded region 122 included in the occupancy data, and so forth. Alternatively or additionally, the uncertainty may be used in a cost function to determine how much, or which portions, of the occlusion grid 130 to use when combining with the occlusion grid 116.

Additionally, in some examples, the occlusion grid 140 may be used in combination with other techniques for determining a certainty related to whether an occluded region (e.g., the occluded region 142) is occupied or not. For instance, the vehicle 114 may determine a direction of travel of the drivable region 118, and by observing the visible region 144 for a threshold amount of time, determine that the occluded region 142 is "pseudo-visible" by assuming that if there were a dynamic object in the occluded region 142, the dynamic object would have traveled out of the occluded region 142 within the threshold amount of time. This may increase confidence by the vehicle 114 to perform various maneuvers while traversing the environment. Additional details regarding determining a likelihood that a region that is not visible to sensors (e.g., an occluded region) is unoccupied by observing the occluded region over time can be found in U.S. patent application Ser. No. 16/289,397, which is incorporated by reference herein in its entirety.

At operation 146, the process can include controlling a vehicle based at least in part on the occupancy data. As discussed in more detail in relation to FIGS. 2 and 3, controlling the vehicle 114 may include altering a stopping position of the vehicle 114 and/or altering a speed of the vehicle 114 to proceed through the environment based on the occupancy data received from the object 108. In some cases, the vehicle 114 may be controlled based on a certainty associated with the occupancy data, e.g., the vehicle 114 may proceed through the environment with greater assertiveness (greater speed, later stopping position, etc.) and less hesitancy when provided with occupancy information from the object 108.

Figure 2:
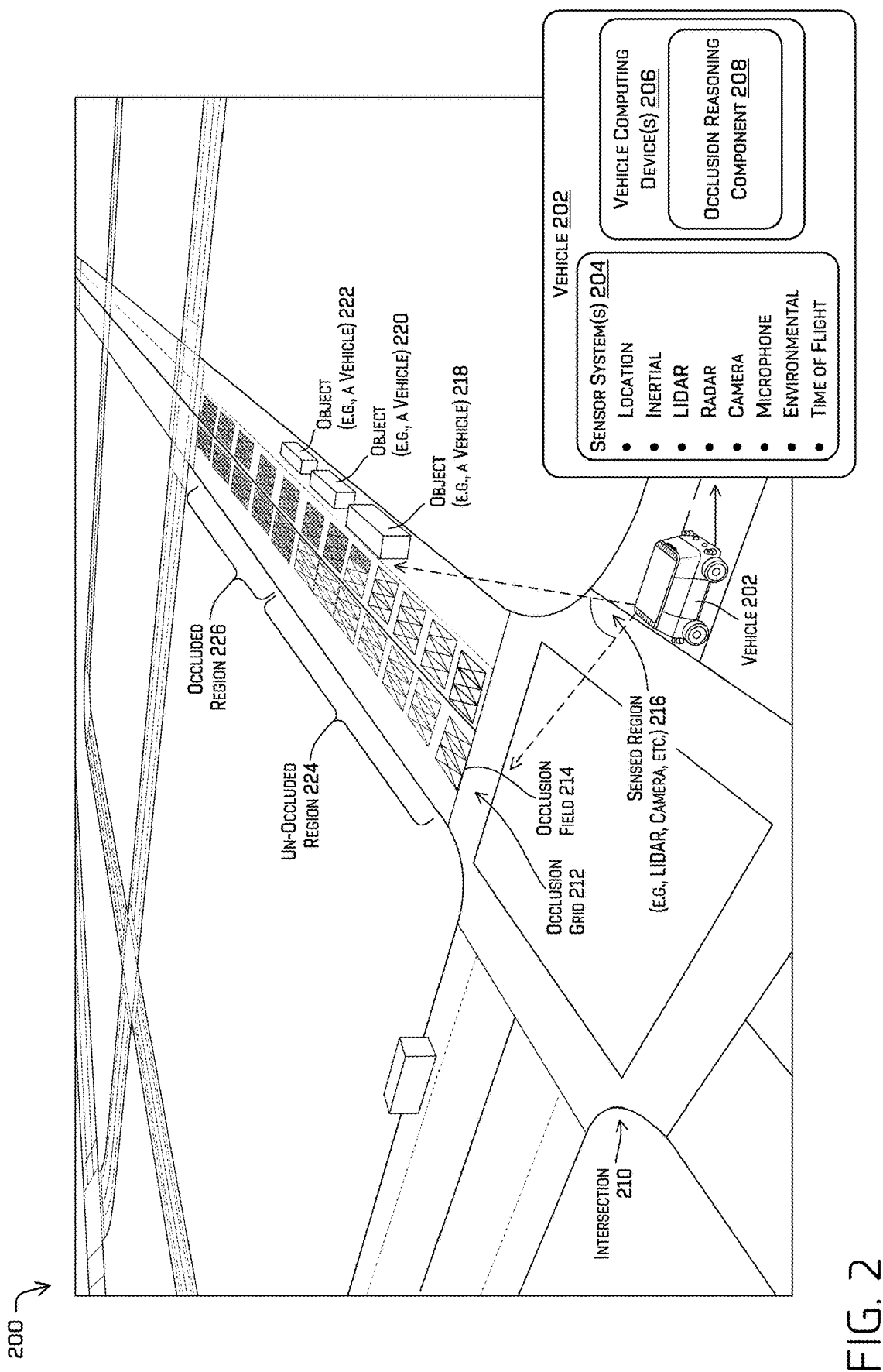
FIG. 2 is an environment illustrating a perspective view of an example occlusion grid comprising a plurality of occlusion fields in an environment, and illustrating a vehicle including an occlusion reasoning component to determine occluded and un-occluded regions of the occlusion grid resulting from obstacles, in accordance with examples of the disclosure.

FIG. 2 is an environment 200 illustrating a perspective view of an example occlusion grid comprising a plurality of occlusion fields in an environment, and illustrating a vehicle including an occlusion reasoning component to determine occluded and un-occluded regions of the occlusion grid resulting from obstacles, in accordance with examples of the disclosure.

As illustrated, the environment 200 can include a vehicle 202 that includes one or more sensor system(s) 204 capturing data representing the environment 200.

In at least one example, and as noted above, the vehicle 202 can be associated with sensor system(s) 204 that can be disposed on the vehicle 202. The sensor system(s) 204 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time-of-flight sensors (e.g., RF-modulated light sources, range gated imagers, direct time-of-flight imagers, etc.), etc. The sensor system(s) 204 can generate sensor data, which can be utilized by vehicle computing device(s) 206 associated with the vehicle 202.

In at least one example, the vehicle computing device(s) 206 can utilize sensor data in an occlusion reasoning component 208. For example, the occlusion reasoning component 208 can access occlusion data and/or map data to determine occlusion state(s) and occupancy state(s) of occlusion fields in an occlusion grid. As discussed herein, the occlusion reasoning component 208 may obtain occupancy data from one or more other sources (e.g., other vehicles, a computing device remote from the vehicle 202 which collects sensed data from other sources, and/or sensing devices throughout the environment (e.g., on buildings, traffic signs, bicycles, pedestrian devices, and the like)). The occlusion reasoning component 208 may combine occupancy data received from the other source(s) with the occlusion grid 212 determined from the current perspective of the vehicle 202 in the environment 200 to refine what is known about the occluded region 226.

By way of example, and without limitation, the vehicle 202 in the environment 200 is approaching an intersection 210. In some examples, the vehicle 202 can access map data and can determine that an occlusion grid 212 is associated with the intersection 210. In some examples, the intersection 210 can represent an intersection where the vehicle 202 is required to yield to one-way traffic entering the intersection 210.

The occlusion grid 212 can include a plurality of occlusion fields dividing a portion of the environment 200 into discrete regions. Though depicted as homogeneously sized regions for illustration, the occlusion fields need not be so limiting and can have non-uniform dimensions (e.g., larger or smaller based at least in part on a distance from vehicle 202, type of drivable area (e.g., city street, highway, etc.) or the like). In some examples, an occlusion field 214 can represent an occlusion state (e.g., an indication of whether the occlusion field 214 is within a sensed region 216 associated with one or more sensors of the vehicle 202). As can be understood, the environment 200 may include one or more objects 218, 220, and 222 that cause a portion of the occlusion grid 212 to fall outside of the sensed region 216 of the vehicle 202. Accordingly, an un-occluded region 224 of the occlusion grid 212 can represent a region of the occlusion grid 212 that can be "seen" by the vehicle 202, which is to say, the vehicle 202 can capture sensor data representing the un-occluded region 224. Similarly, an occluded region 226 can represent a region of the occlusion grid 212 that cannot be "seen" by the vehicle 202 (e.g., based on, for example, an expected sensor range, field of view, corresponding map data, and the like). In some examples, the occlusion grid 212 may be generated based on time and/or information necessary to perform a maneuver (e.g., crossing a lane given an estimate speed of oncoming traffic results in a minimum visibility distance of the oncoming traffic lane). As illustrated in FIG. 2, the occlusion fields in the occluded region 226 are shaded gray to represent the lack of sensor data corresponding to that region, while the un-occluded region 224 is not shaded. In some instances, when an occlusion field is occupied by an object, the occlusion field can store additional metadata indicating an identity of the object as well as data indicative of the path of the object through the occlusion grid.

Additional details directed to controlling a first vehicle based on occupancy data shared from other sources are discussed below in connection with FIGS. 3 and 4, while additional details directed to controlling a second vehicle to obtain additional occupancy data are discussed below in connection with FIG. 5.

Figure 3:
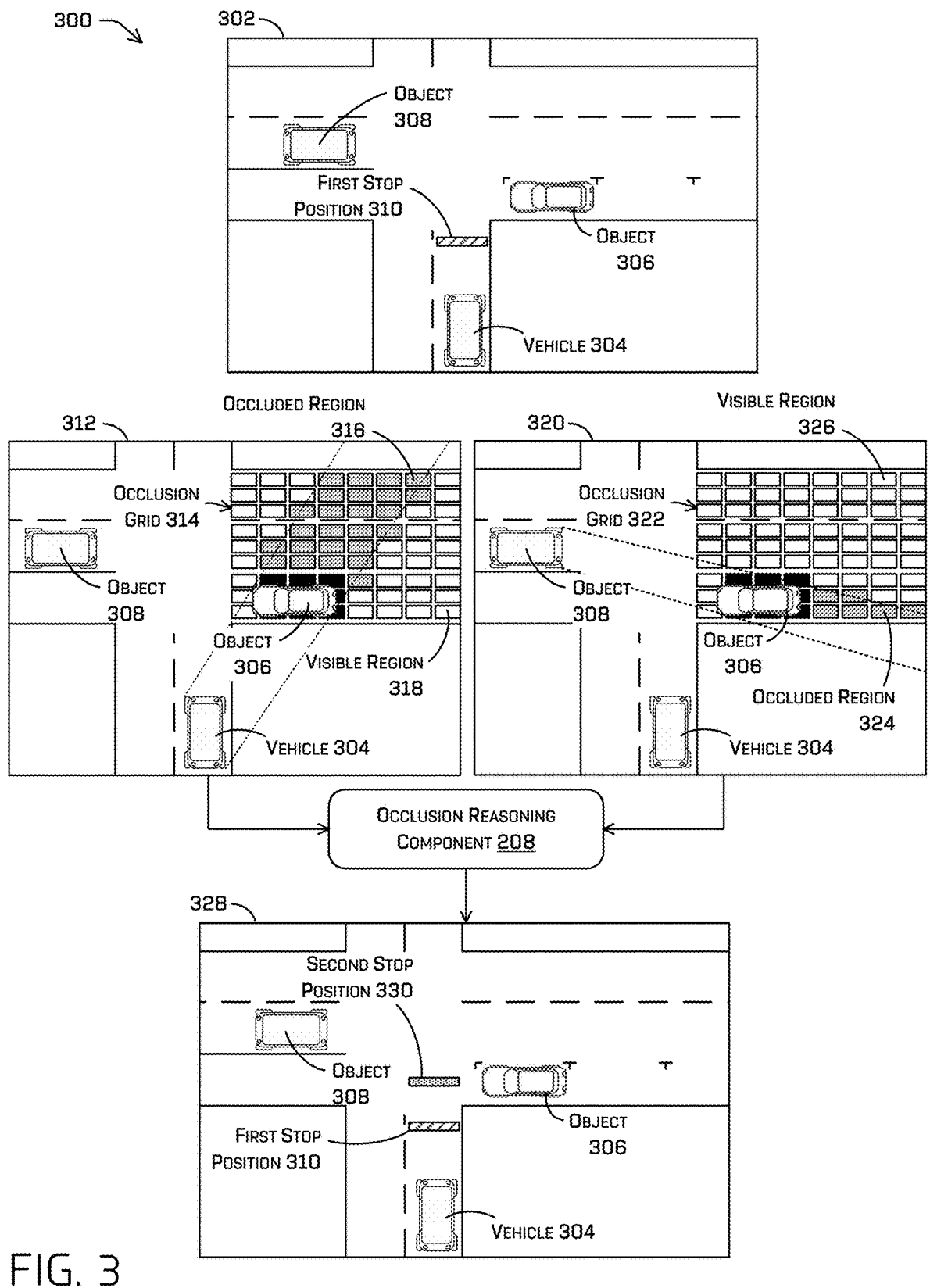
FIG. 3 is an example of updating a stop position for an autonomous vehicle based on shared occupancy data, in accordance with examples of the disclosure.

FIG. 3 is an example 300 of updating a stop position for an autonomous vehicle based on shared occupancy data, in accordance with examples of the disclosure. Such an example is meant to be illustrative of using the shared occupancy data and is not meant to be limiting, as such shared data may be used in a multitude of circumstances.

The example 300 includes a first representation 302 depicting a vehicle 304, an object 306, and an object 308 at a junction. The vehicle 304 may be an autonomous vehicle as described herein. The object 306 may represent a parked vehicle on a drivable region. In some examples, the object 308 is also an autonomous vehicle, although examples are considered in which the object 308 comprises another device type configured to sense features of the environment. The first representation 302 further depicts a first stop position 310 for the vehicle 304. The first stop position 310 may correspond to a position at the junction that the vehicle 304 plans to stop based on visibility of the area surrounding the junction, traffic laws and/or common practices, oncoming vehicle and/or pedestrian traffic, an amount of time for the vehicle 304 to reach a target speed to traverse the junction, and so forth.

A second representation 312 depicts the vehicle 304, the object 306, and the object 308 at the junction, along with an occlusion grid 314 generated by the vehicle 304 from the perspective of the vehicle 304. Similar to the discussion above, the occlusion grid 314 can include a plurality of occlusion fields (e.g., the boxes pictured in the occlusion grid 314), which can represent discrete areas of the environment, such as drivable regions. The occlusion fields of the occlusion grid 314 can indicate an occlusion state and an occupancy state determined using lidar data, radar data, and/or image data captured by the vehicle 304. In the second representation 312, occlusion fields of the occlusion grid 314 that are obstructed (occluded) by the object 306 are colored light gray, indicating an occluded region 316. Occlusion fields of the occlusion grid 314 that are occupied are colored black (e.g., at least partially covered by the object 306). Occlusion fields of the occlusion grid 314 colored white indicate a visible region 318, which is visible from a perspective of the vehicle 304 at a current location of the vehicle 304.

A third representation 320 depicts the vehicle 304, the object 306, and the object 308 at the junction, along with an occlusion grid 322 generated by the object 308 from the perspective of the object 308. The occlusion grid 322 can include a plurality of occlusion fields (e.g., the boxes pictured in the occlusion grid 322), where the occlusion fields can indicate an occlusion state and an occupancy state determined using lidar data, radar data, and/or image data captured by the object 308. In the third representation 320, occlusion fields of the occlusion grid 322 that are obstructed (occluded) by the object 306 are colored light gray, indicating an occluded region 324. Occlusion fields of the occlusion grid 322 that are occupied are colored black (e.g., at least partially covered by the object 306). Occlusion fields of the occlusion grid 322 colored white indicate a visible region 326 which is visible from a perspective of the object 308 at a current location of the object 308.

In examples, the object 308 may share the occlusion grid 322, including occupancy data for the occlusion fields in the occlusion grid 322, with the vehicle 304. Upon receiving the occlusion grid 322, the occlusion reasoning component 208 of the vehicle 304 may combine the occlusion grid 322 with the occlusion grid 314, such as described in relation to FIG. 1. The vehicle 304 may use the combination of the occlusion grid 314 and the occlusion grid 322 to update the first stop position 310 based on the shared occupancy data.

For example, a fourth representation 328 depicts the vehicle 304, the object 306, and the object 308 at the junction, along with the first stop position 310 and a second stop position 330. In this example, the second stop position 330 is closer to a center of the junction, as a result of the occupancy data indicating the visible regions 318 and 326, without objects such as vehicles, bicycles, and/or pedestrians in the visible regions 318 and 326. The second stop position 330 may be a result of an increased assertiveness by the vehicle 304 based on the additional information provided by the shared occlusion grid 322, allowing the vehicle 304 to traverse the environment not only more quickly, but also more safely than when relying only upon data generated by the vehicle 304 itself.

In some examples, the location of the second stop position 330 may be farther from the center of the junction than the first stop position 310 (e.g., reversed from the positions depicted in the example 300). For instance, the vehicle 304 may creep into the junction to the second stop position 330 if less information is generated from the occlusion grid 314 and the occlusion grid 322, so that the vehicle 304 may determine an occupancy of a larger portion of the occlusion grid 314 before proceeding through the junction.

Figure 4:
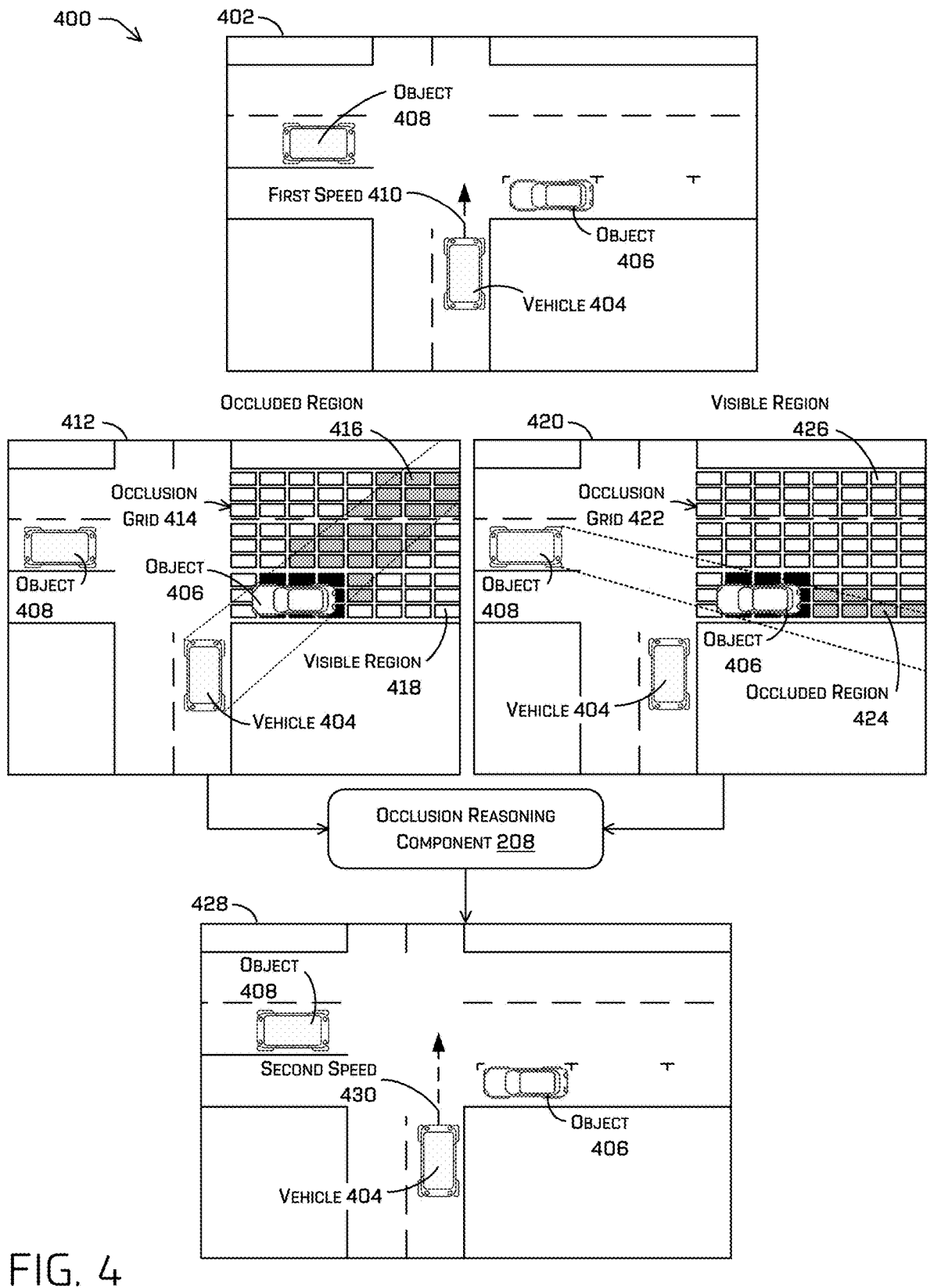
FIG. 4 is an example of changing a speed of an autonomous vehicle to traverse an environment based on shared occupancy data, in accordance with examples of the disclosure.

FIG. 4 is an example 400 of changing a speed of an autonomous vehicle to traverse an environment based on shared occupancy data, in accordance with examples of the disclosure.

The example 400 includes a first representation 402 depicting a vehicle 404, an object 406, and an object 408 at a junction. The vehicle 404 may be an autonomous vehicle as described herein. The object 406 may represent a parked vehicle on a drivable region. In some examples, the object 408 is also an autonomous vehicle, although examples are considered in which the object 408 comprises another device type configured to sense features of the environment. The first representation 402 further depicts a first speed 410 for the vehicle 404 to traverse the junction. The first speed 410 may correspond to a relatively conservative speed (e.g., 3 miles per hour (mph), 5 mph, 10 mph, etc.) that the vehicle 404 plans on traversing the junction based on visibility of the area surrounding the junction, traffic laws and/or common practices, oncoming vehicle and/or pedestrian traffic, an amount of time for the vehicle 404 to reach a target speed to traverse the junction, and so forth.

A second representation 412 depicts the vehicle 404, the object 406, and the object 408 at the junction, along with an occlusion grid 414 generated by the vehicle 404 from the perspective of the vehicle 404. Similar to the discussion above, the occlusion grid 414 can include a plurality of occlusion fields (e.g., the boxes pictured in the occlusion grid 414), which can represent discrete areas of the environment, such as drivable regions. The occlusion fields of the occlusion grid 414 can indicate an occlusion state and an occupancy state determined using lidar data, radar data, and/or image data captured by the vehicle 404. In the second representation 412, occlusion fields of the occlusion grid 414 that are obstructed (occluded) by the object 406 are colored light gray, indicating an occluded region 416. Occlusion fields of the occlusion grid 414 that are occupied are colored black (e.g., at least partially covered by the object 406). Occlusion fields of the occlusion grid 414 colored white indicate a visible region 418, which is visible from a perspective of the vehicle 404 at a current location of the vehicle 404.

A third representation 420 depicts the vehicle 404, the object 406, and the object 408 at the junction, along with an occlusion grid 422 generated by the object 408 from the perspective of the object 408. The occlusion grid 422 can include a plurality of occlusion fields (e.g., the boxes pictured in the occlusion grid 422), where the occlusion fields can indicate an occlusion state and an occupancy state determined using lidar data, radar data, and/or image data captured by the object 408. In the third representation 420, occlusion fields of the occlusion grid 422 that are obstructed (occluded) by the object 406 are colored light gray, indicating an occluded region 424. Occlusion fields of the occlusion grid 422 that are occupied are colored black (e.g., at least partially covered by the object 406). Occlusion fields of the occlusion grid 422 colored white indicate a visible region 426 which is visible from a perspective of the object 408 at a current location of the object 408.

In examples, the object 408 may share the occlusion grid 422, including occupancy data for the occlusion fields in the occlusion grid 422, with the vehicle 404. Upon receiving the occlusion grid 422, the occlusion reasoning component 208 of the vehicle 404 may combine the occlusion grid 422 with the occlusion grid 414, such as described in relation to FIG. 1. The vehicle 404 may use the combination of the occlusion grid 414 and the occlusion grid 422 to change the first speed 410 (e.g., by increasing or decreasing) based on the shared occupancy data.

For example, a fourth representation 428 depicts the vehicle 404, the object 406, and the object 408 at the junction, along with a second speed 430 having a greater magnitude (e.g., indicating a faster speed) than the first speed 410. In this example, the second speed 430 indicates the vehicle 404 proceeding faster through the junction, as a result of the occupancy data indicating the visible regions 418 and 426, without objects such as vehicles, bicycles, and/or pedestrians in the visible regions 418 and 426. The second speed 430 may be a result of an increased assertiveness by the vehicle 404 based on the additional information provided by the shared occlusion grid 422, allowing the vehicle 404 to traverse the environment not only more quickly, but also more safely than when relying only upon data generated by the vehicle 404 itself.

Figure 5:
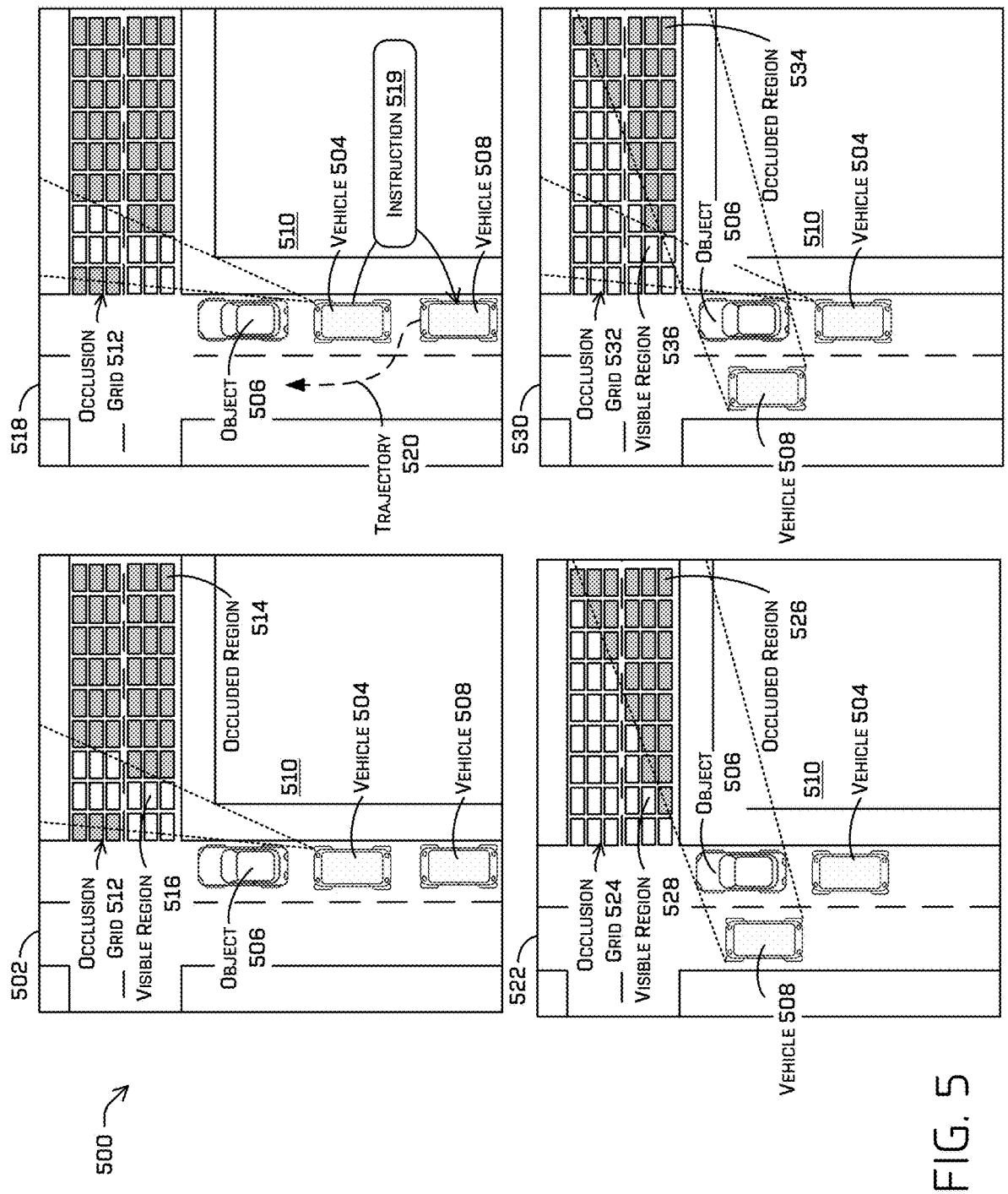
FIG. 5 is an example of a first vehicle instructing a second vehicle to alter a trajectory of the second vehicle to obtain additional occupancy data for the first vehicle, in accordance with examples of the disclosure.

FIG. 5 is an example 500 of a first vehicle instructing a second vehicle to alter a trajectory of the second vehicle to obtain additional occupancy data for the first vehicle, in accordance with examples of the disclosure.

The example 500 includes a first representation 502 depicting a vehicle 504, an object 506, and a vehicle 508 near a junction. The vehicle 504 and the vehicle 508 may both be autonomous vehicles as described herein. The object 506 may represent a vehicle parked in a traffic lane on a drivable region, where the vehicle 504 and the vehicle 508 are using the traffic lane occupied by the object 506 to traverse the environment. In this example, the vehicle 504 may be intending to execute a right-hand turn at the junction, but may need extra time and/or space to execute the maneuver due to the impeding object 506. Additionally, the first representation 502 depicts a building 510, which may obstruct at least a portion of the environment from sensors of the vehicle 504.

The first representation 502 further depicts an occlusion grid 512 generated by the vehicle 504 from the perspective of the vehicle 504. Similar to the discussion above, the occlusion grid 512 can include a plurality of occlusion fields (e.g., the boxes pictured in the occlusion grid 512), which can represent discrete areas of the environment, such as drivable regions. The occlusion fields of the occlusion grid 512 can indicate an occlusion state and an occupancy state determined using lidar data, radar data, and/or image data captured by the vehicle 504. In the first representation 502, occlusion fields of the occlusion grid 512 that are obstructed (occluded) by the object 506 and the building 510 are colored light gray, indicating an occluded region 514. Occlusion fields of the occlusion grid 512 colored white indicate a visible region 516, which is visible from a perspective of the vehicle 504 at a current location of the vehicle 504.

Because a significant portion of the occlusion grid 512 generated by the vehicle 504 is occluded at the current location of the vehicle 504, the vehicle 504 may send an instruction to the vehicle 508 to alter a trajectory to obtain additional information (e.g., occupancy data) about the occluded region 514. For example, a second representation 518 depicts the vehicle 504, the object 506, and the vehicle 508, along with an instruction 519 being sent from the vehicle 504 to the vehicle 508. The instruction 519 may indicate a request for occupancy data corresponding to a location such as the occluded region 514, and/or a trajectory 520 for the vehicle 508 to follow to obtain occupancy data for the occluded region 514. The trajectory 520 may, in some cases, be generated by the vehicle 504 to indicate how the vehicle 508 should proceed to obtain relevant occupancy data based on the current position of the vehicle 504. Alternatively or additionally, the trajectory 520 may be generated (or updated from a trajectory received from the vehicle 504) by the vehicle 508 based on determinations made by the vehicle 508 on how to proceed to obtain relevant occupancy data. In some cases, the vehicle 508 may generate and/or alter the trajectory 520 based on whether the vehicle 508 is currently executing a route (and how far the trajectory 520 would deviate from the route), whether the vehicle 508 is carrying passengers or cargo (and how long the trajectory 520 would delay arrival), an amount of time before the vehicle 508 is needed at a destination (and how long the trajectory 520 would delay arrival), and the like. The vehicle 508 may optimize a cost function for determining a trajectory that takes into account an amount of increased visibility of the occluded region 526 that the vehicle 508 can provide, how far the vehicle 508 deviates from an original trajectory (e.g., change in time, increase in fuel, etc.), and the like.

A third representation 522 depicts the vehicle 504, the object 506, and the vehicle 508 at a different location as the vehicle 508 has followed the trajectory 520. The third representation 522 further depicts an occlusion grid 524 generated by the vehicle 508 from the perspective of the vehicle 508 after following the trajectory 520. Similar to the discussion above, the occlusion grid 524 can include a plurality of occlusion fields (e.g., the boxes pictured in the occlusion grid 524). The occlusion fields of the occlusion grid 524 can indicate an occlusion state and an occupancy state determined using lidar data, radar data, and/or image data captured by the vehicle 508. In the third representation 522, occlusion fields of the occlusion grid 524 that are obstructed (occluded) by the object 506 are colored light gray, indicating an occluded region 526. Occlusion fields of the occlusion grid 524 colored white indicate a visible region 528, which is visible from a perspective of the vehicle 508 at a current location of the vehicle 508 after following the trajectory 520. As described herein, the vehicle 508 may share the occlusion grid 524 and the occupancy information included therein with the vehicle 504.

For example, a fourth representation 530 depicts the scene of the third representation 522, with occupancy information from the occlusion grid 512 (generated by the vehicle 504) combined with occupancy data from the occlusion grid 524 (generated by the vehicle 508), thus forming an occlusion grid 532. The occlusion grid 532 can represent an occlusion state, an occupancy state, and/or an indeterminate state for the occlusion fields of the occlusion grid 532 based on combining such data from the occlusion grid 512 with the occlusion grid 524. In the fourth representation 530, the occlusion fields of the occlusion grid 532 that are obstructed (occluded) by the object 506 from the combined perspectives of the vehicle 504 and the vehicle 508 are colored light gray, indicating an occluded region 534. Occlusion fields of the occlusion grid 532 colored white indicate a visible region 536, which is visible when the perspectives of the vehicle 504 and the vehicle 508 are combined at the current locations of the vehicle 504 and the vehicle 508. By instructing the vehicle 508 to alter its trajectory, the vehicle 504 may gain additional knowledge of the occluded region 514 when other devices or vehicles do not have a line of sight to the occluded region 514, thus allowing the vehicle 504 to proceed faster and more safely throughout the environment.

Figure 6:
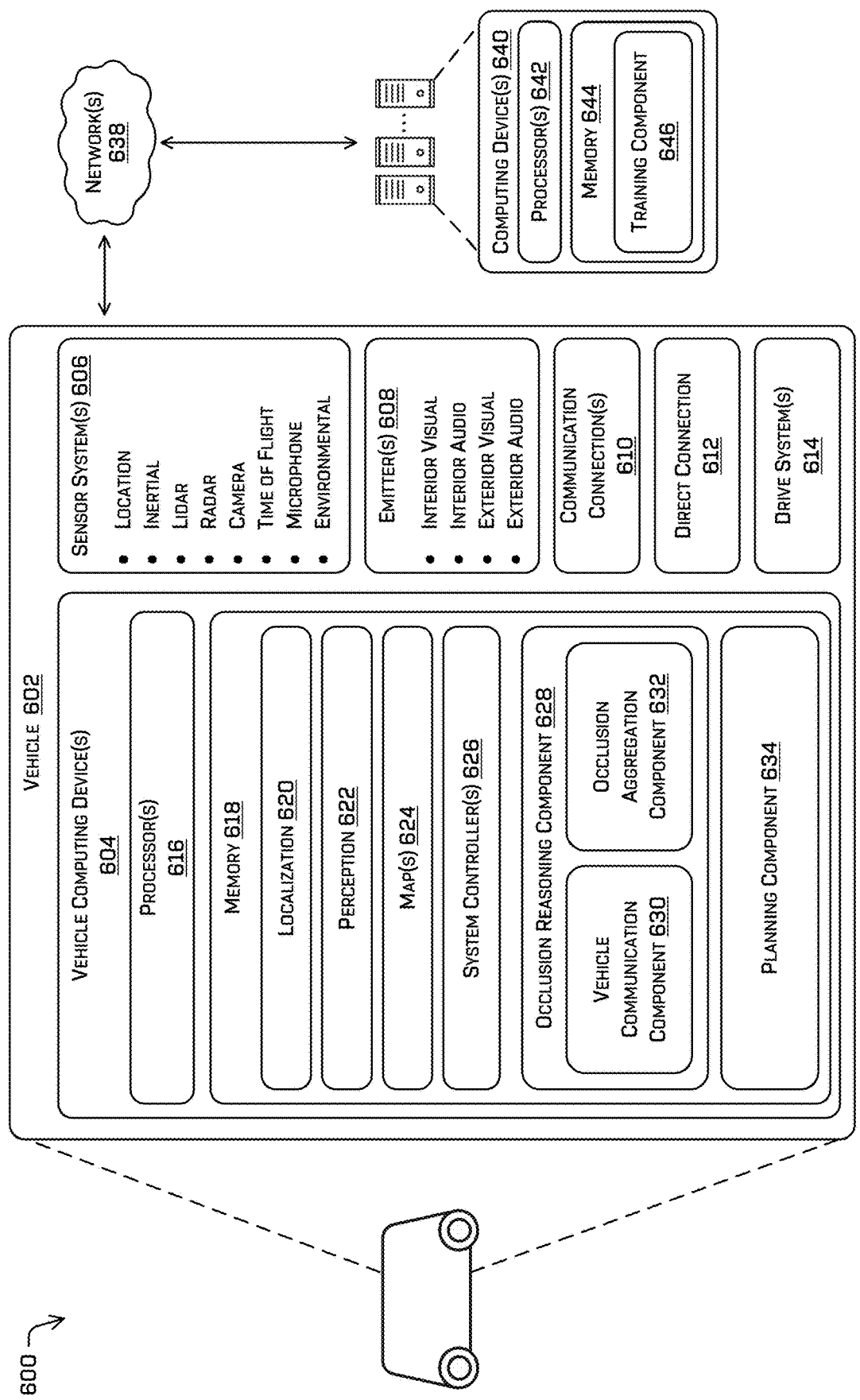
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can correspond to the vehicle 114 or the object 108 of FIG. 1, the vehicle 202 of FIG. 2, the vehicle 304 or the object 308 of FIG. 3, the vehicle 404 or the object 408 of FIG. 4, and/or the vehicle 504 or the vehicle 508 of FIG. 5.

The vehicle 602 can include vehicle computing device(s) 604, one or more sensor systems 606, one or more emitters 608, one or more communication connections 610, at least one direct connection 612, and one or more drive systems 614.

The vehicle computing device(s) 604 can include one or more processors 616 and memory 618 communicatively coupled with the one or more processors 616. In the illustrated example, the vehicle 602 is an autonomous vehicle; however, the vehicle 602 could be any other type of vehicle or robotic platform. In the illustrated example, the memory 618 of the vehicle computing device(s) 604 stores a localization component 620, a perception component 622, one or more maps 624, one or more system controllers 626, an occlusion reasoning component 628, a vehicle communication component 630, an occlusion aggregation component 632, and a planning component 634. Though depicted in FIG. 6 as residing in the memory 618 for illustrative purposes, it is contemplated that the localization component 620, the perception component 622, the one or more maps 624, the one or more system controllers 626, the occlusion reasoning component 628, the vehicle communication component 630, the occlusion aggregation component 632, and the planning component 634 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for determining to retrieve map data including an occlusion grid from memory, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, stoplight, stop sign, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 624 can include at least one map (e.g., images and/or a mesh). In some examples, the vehicle 602 can be controlled based at least in part on the maps 624. That is, the maps 624 can be used in connection with the localization component 620, the perception component 622, the occlusion reasoning component 628, and/or the planning component 634 to determine a location of the vehicle 602, identify objects in an environment, and/or generate routes and/or trajectories to navigate within an environment.

In some examples, the one or more maps 624 can be stored on a remote computing device(s) (such as the computing device(s) 640) accessible via network(s) 638. In some examples, multiple maps 624 can be stored based on, for example, a characteristic (e.g., type of entity, time of day, day of week, season of the year, etc.). Storing multiple maps 624 can have similar memory requirements, but increase the speed at which data in a map can be accessed.

In some examples, the one or more maps 624 can store occlusion grids associated with individual locations in an environment. For example, as the vehicle 602 traverses the environment and as maps representing an area proximate to the vehicle 602 are loaded into memory, one or more occlusion grids associated with a location can be loaded into memory as well. In some examples, an occlusion grid can be generated dynamically based on map data.

In general, the occlusion reasoning component 628 can determine occluded areas of an environment caused by one or multiple objects in the environment based on data provided by the sensor system(s) 606. The occlusion reasoning component, in some examples, may correspond to the occlusion reasoning component 208 of FIG. 2. In some instances, the occlusion reasoning component 628 can provide occlusion information generated by the occlusion reasoning component 628 to the planning component 634 to determine when and/or how to control the vehicle 602 to traverse an environment. As discussed herein, the occlusion reasoning component 628 can receive lidar data, image data, map data, and the like to determine occlusion-related information in an environment. Examples of generating and/or using an occlusion grid are discussed in U.S. patent application Ser. No. 16/011,436, filed Jun. 18, 2018. Application Ser. No. 16/011,436 is herein incorporated by reference, in its entirety.

The vehicle communication component 630 can communicate with one or more other devices configured to sense features of the environment, and receive occupancy data associated with the sensed features of the environment from the other devices. The other devices may include vehicles, computing devices disposed throughout the environment, and/or server computing devices that compile occupancy data from one or more sources and distribute the occupancy data as appropriate, as described herein. In some examples, the vehicle communication component 630 may initiate requests for occupancy data based on a location of the vehicle 602 (e.g., based on a location determined by the localization component 620) where known occluding objects are located in the environment, such as buildings, signs, barriers, or other generally permanent occluding objects. Alternatively or additionally, the vehicle communication component 630 may initiate requests for occupancy data based on sensed occluding objects present in the environment (e.g., sensed by the sensor system(s) 606) that are dynamic and generally are not present in map data, such as parked cars, moving cars, pedestrians, construction zones, and the like. For example, the vehicle 602 may follow a trajectory proximate a construction zone not included in map data, where the trajectory is based on an occlusion grid received from another vehicle having visibility of areas occluded by construction equipment, altered driving routes due to construction, and the like. In response to such requests, the vehicle communication component 630 may receive occupancy data from other devices, as described. Further, in some cases, the vehicle communication component 630 may passively receive occupancy data from other devices broadcasting such data, and/or may broadcast occupancy data generated by the occlusion reasoning component 628 to other devices as well.

The occlusion aggregation component 632 can aggregate occupancy data generated by the vehicle computing devices 604 and/or occupancy data received from other devices configured to sense features of the environment. For instance, the occlusion aggregation component 632 may combine an occlusion grid indicating occupancy of individual occlusion fields generated by the vehicle computing devices 604 from a first perspective location, with an occlusion grid generated by a different vehicle and received by the vehicle communication component 630 indicating occupancy of the individual occlusion fields from a second perspective location. The occlusion aggregation component 632 may assign an uncertainty to the occupancy data received from the other devices based on a time that the occupancy data was captured by the other device, types and/or accuracy of sensors used to generate the occupancy data, an amount of time that the other device has observed the region, an amount of the occluded region included in the occupancy data, and so forth. In some examples, the occlusion aggregation component 632 may apply a cost function to the occupancy data, such as by applying the cost function to the time that the occupancy data was captured by the other device, the types and/or accuracy of sensors used to generate the occupancy data, the amount of time that the other device has observed the region, the amount of the occluded region included in the occupancy data, and so on.

In general, the planning component 634 can determine a path for the vehicle 602 to follow to traverse the environment. For example, the planning component 634 can determine various routes and trajectories and various levels of detail. For example, the planning component 634 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 634 can generate an instruction for guiding the autonomous vehicle along at least a portion of the route from the first location to the second location. In at least one example, the planning component 634 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate. The planning component 634 may consider one or more costs associated with occlusion grid(s) generated and/or received by the occlusion reasoning component 628 when generating a route or a trajectory for the vehicle 602 to follow.

In some instances, the planning component 634 can generate one or more trajectories for the vehicle 602 based at least in part on the knowledge of occluded areas of the surrounding environment, and/or an uncertainty associated with occupancy of occluded areas, as discussed herein. In some examples, the planning component 634 can use temporal logic, such as linear temporal logic and/or signal temporal logic, to evaluate one or more trajectories of the vehicle 602.

In at least one example, the vehicle computing device(s) 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

As can be understood, the components discussed herein (e.g., the localization component 620, the perception component 622, the one or more maps 624, the one or more system controllers 626, the occlusion reasoning component 628, the vehicle communication component 630, the occlusion aggregation component 632, and the planning component 634) are described as divided for illustrative purposes. However, the operations performed by the various components can be combined or performed in any other component. By way of example, occlusion aggregation functions may be performed by the perception component 622 (e.g., rather than the occlusion aggregation component 632) to reduce the amount of data transferred by the system.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604. Additionally or alternatively, the sensor system(s) 606 can send sensor data, via the one or more networks 638, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s), including, but not limited to, other vehicles. For instance, the communication connection(s) 610 can facilitate communication with other local computing device(s) on the vehicle 602 and/or the drive system(s) 614. Also, the communication connection(s)

610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 638. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In at least one example, the localization component 620, the perception component 622, the one or more maps 624, the one or more system controllers 626, the occlusion reasoning component 628, the vehicle communication component 630, the occlusion aggregation component 632, and the planning component 634 can process sensor data, as described above, and can send their respective outputs, over the one or more network(s) 638, to one or more computing device(s) 640. In at least one example, the localization component 620, the perception component 622, the one or more maps 624, the one or more system controllers 626, the occlusion reasoning component 628, the vehicle communication component 630, the occlusion aggregation component 632, and the planning component 634 can send their respective outputs to the one or more computing device(s) 640 at a particular frequency, after a lapse of a predetermined period of time, in near real-time, etc.

In some examples, the vehicle 602 can send sensor data to one or more computing device(s) 640 via the network(s) 638. In some examples, the vehicle 602 can send raw sensor data to the computing device(s) 640. In other examples, the vehicle 602 can send processed sensor data and/or representations of sensor data to the computing device(s) 640. In some examples, the vehicle 602 can send sensor data to the computing device(s) 640 at a particular frequency, after a lapse of a predetermined period of time, in near real-time, etc. In some cases, the vehicle 602 can send sensor data (raw or processed) to the computing device(s) 640 as one or more log files.

The computing device(s) 640 can include processor(s) 642 and a memory 644 storing a training component 646.

In some instances, the training component 646 can include functionality to train one or more models to determine object locations and/or trajectories, determine occluded regions, determine uncertainties associated with occupancy data received from other devices, determine dynamic object behavior when in an occluded region (e.g., based on a specific location of an occluded region), and the like. In some instances, the training component 646 can communicate information generated by the one or more models to the vehicle computing device(s) 604 to revise how to control the vehicle 602 in response to different situations.

For instance, aspects of some or all of the components discussed herein can include any models, algorithms, and/or machine learning algorithms. For example, in some instances, the components in the memory 644 (and the memory 618, discussed above) can be implemented as a neural network. In some examples, the training component 646 can utilize a neural network to generate and/or execute one or more models to improve various aspects of occlusion reasoning for use in trajectory planning.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 616 of the vehicle 602 and the processor(s) 642 of the computing device(s) 640 can be any suitable processor capable of executing instructions to process data and perform operations as described herein. By way of example and not limitation, the processor(s) 616 and 642 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 644 are examples of non-transitory computer-readable media. The memory 618 and 644 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 640 and/or components of the computing device(s) 640 can be associated with the vehicle 602. That is, the vehicle 602 can perform one or more of the functions associated with the computing device(s) 640, and vice versa. Further, aspects of the occlusion reasoning component 628 and/or the planning component 634 can be performed on any of the devices discussed herein.

Figure 7:
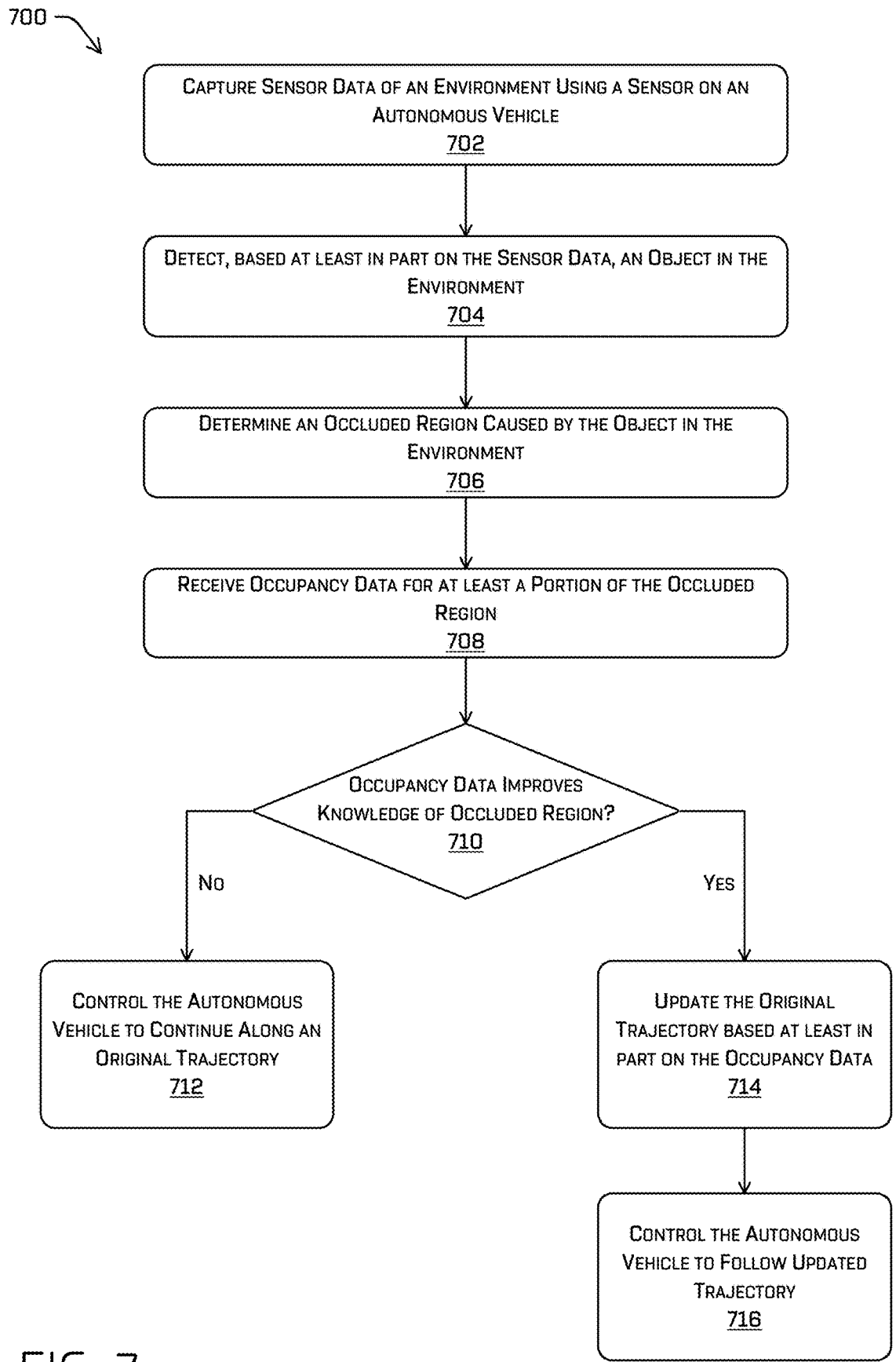
FIG. 7 depicts an example process for capturing sensor data, detecting an object in the environment based on the sensor data, determining an occluded region caused by the object, receiving occupancy data for at least a portion of the occluded region, and controlling an autonomous vehicle based on the whether the occupancy data improves knowledge of the occluded region, in accordance with examples of the disclosure.

FIG. 7 depicts an example process 700 for capturing sensor data, detecting an object in the environment based on the sensor data, determining an occluded region caused by the object, receiving occupancy data for at least a portion of the occluded region, and controlling an autonomous vehicle based on the whether the occupancy data improves knowledge of the occluded region, in accordance with examples of the disclosure. For example, some or all of the process 700 can be performed by one or more components in FIG. 6, as described herein. For example, some or all of the process 700 can be performed by the vehicle computing device(s) 604. Further, any of the operations described in the example process 700 may be executed in parallel, in a different order than depicted in the process 700, and/or omit any of the operations of the depicted process 700.

At operation 702, the process can include capturing sensor data of an environment using a sensor on an autonomous vehicle. In some examples, the operation 702 can include capturing lidar data, image data, radar data, time of flight data, and the like, of the environment.

At operation 704, the process can include detecting, based at least in part on the sensor data, an object in the environment. For example, sensor data captured at operation 702 can be used to determine information about an object in the environment, including but not limited to, a type of the object (e.g., semantic information indicating a classification of the object, such as a vehicle, pedestrian, bicycle, animal, and the like). In some instances, the operations can include determining the type of the object, a bounding box associated with the object, segmentation information associated with the object, and/or movement information associated with the object, and any uncertainties associated therewith, as discussed herein. In addition, the operation 704 may determine static or otherwise generally permanent objects in the environment from the sensor data and/or from map data of the environment.

At operation 706, the process can include determining an occluded region caused by the object in the environment. For example, an occlusion grid may be applied to map data of the environment surrounding the vehicle. The sensor data may then be applied to determine an occupancy state of occlusion fields of the occlusion grid at the location of the object. Occlusion fields that are obfuscated by the object from the sensors may be categorized as indeterminate, as the vehicle may not be able to tell whether such fields are occupied or unoccupied by other objects in the environment.

At operation 708, the process can include receiving occupancy data for at least a portion of the occluded region. In some examples, the occupancy data may be received from another vehicle (or other type of sensing device) in the environment that has a line of sight to the occluded region, such as based on a request for occupancy data sent out by the vehicle and/or received from another vehicle broadcasting occupancy data of the environment. Alternatively or additionally, the occupancy data may be received from a remote computing device that stores and distributes occupancy data based on a location of the vehicle, a time that the occupancy data was generated, and so forth.

At operation 710, the process can include determining whether the occupancy data improves knowledge of the occluded region. For example, the vehicle may apply a cost function to the occupancy data that penalizes the occupancy data based on age, amount of the occluded region included in the received occupancy data, an accuracy of a sensor used to generate the occupancy data, and the like.

If the occupancy data does not improve knowledge of the occluded region, the process can include, at operation 712, controlling the autonomous vehicle to continue along an original trajectory. For instance, if a duration of time has passed that exceeds a threshold amount of time since the occupancy data was captured, the occupancy data may be determined to not improve knowledge of the occluded region, and thus the autonomous vehicle may proceed through the environment based on information collected and/or generated by the autonomous vehicle itself. In some cases, the occupancy data may be combined from other sources, regardless of whether the occupancy data improves knowledge of the occluded region, and may be weighted based on how much the occupancy data changes knowledge of the occluded region.

However, if the occupancy data does improve knowledge of the occluded region, the process can include, at operation 714, updating the original trajectory based at least in part on the occupancy data. As described herein, the trajectory may be updated by changing a stop position of the autonomous vehicle, changing a speed of the autonomous vehicle, and the like. Then, at operation 716, the process can include controlling the autonomous vehicle to follow the updated trajectory.

Example Clauses

A: A system comprising: one or more processors; and one or more computer-readable media storing instructions executable by the one or more processors, wherein the instructions, when executed, cause the system to perform operations comprising: receiving sensor data of an environment captured by a sensor on a first vehicle, the first vehicle being at a first location in the environment; detecting, based at least in part on the sensor data, an object in the environment; determining, based at least in part the sensor data, an occluded region in the environment associated with the object; receiving, from a second vehicle at a second location in the environment, an occlusion grid associated with at least a portion of the occluded region; and controlling the first vehicle to traverse the environment based at least in part on the occlusion grid associated with the at least the portion of the occluded region.

B: The system of paragraph A, the operations further comprising sending a request from the first vehicle to the second vehicle for the occlusion grid responsive to determining the occluded region.

C: The system of paragraph A or B, the operations further comprising: evaluating a cost function based at least in part on the occlusion grid, wherein evaluating the cost function is based at least in part on a time associated with receiving the occlusion grid or a size of the portion relative to the occluded region included in the occlusion grid, and wherein controlling the first vehicle is further based on evaluating the cost function.

D: The system of any of claims A-C, the operations further comprising: determining a first stop position for the first vehicle at a junction prior to receiving the occlusion grid; and determining a second stop position for the first vehicle at the junction based at least in part on the occlusion grid, wherein controlling the first vehicle to traverse the environment comprises controlling the first vehicle to stop at the second stop position.

E: The system of any of claims A-D, the operations further comprising: determining a first speed for the first vehicle to traverse the environment prior to receiving the occlusion grid from the second vehicle; and determining a second speed for the first vehicle to traverse the environment based at least in part on the occlusion grid, the second speed being faster than the first speed, wherein controlling the first vehicle to traverse the environment comprises controlling the first vehicle to traverse the environment at the second speed.

F: A method comprising: receiving sensor data of an environment captured by a sensor on a vehicle; determining, based at least in part on the sensor data representing the environment, an occluded region in the environment; receiving an occlusion grid for at least a portion of the occluded region; and controlling the vehicle based at least in part on the occlusion grid for the at least the portion of the occluded region.

G: The method of paragraph F, wherein the occlusion grid comprises a time stamp associated with a time that the occlusion grid was generated.

H: The method of paragraph G, further comprising: evaluating a cost function based at least in part on the occlusion grid, wherein evaluating the cost function is based at least in part on the time stamp, and wherein controlling the vehicle is further based on evaluating the cost function.

L: The method of any of claims F-H, wherein the sensor data is first sensor data, the method further comprising receiving the occlusion grid from another vehicle in the environment, the other vehicle being able to capture second sensor data of the at least the portion of the occluded region.

J: The method of paragraph I, further comprising sending, to the other vehicle, an instruction to alter a trajectory of the other vehicle to alter the at least the occluded region.

K: The method of paragraph J, wherein the instruction to alter the trajectory comprises at least one of: an instruction to change a position of the other vehicle within a lane, an instruction to move from the lane to another lane, or an instruction to change a speed of the other vehicle.

L: The method of any of claims F-K, wherein the vehicle is located at a junction, and wherein controlling the vehicle comprises controlling the vehicle to traverse the junction based at least in part on the occlusion grid for the at least the portion of the occluded region.

M: The method of any of claims F-L, wherein the vehicle is located in a traffic lane, and wherein controlling the vehicle comprises controlling the vehicle to traverse the traffic lane or change to another traffic lane based at least in part on the occlusion grid for the at least the portion of the occluded region.

N: The method of any of claims F-M, wherein the vehicle is located proximate a construction zone, and wherein controlling the vehicle comprises controlling the vehicle to traverse the environment proximate the construction zone based at least in part on the occlusion grid for the at least the portion of the occluded region.

O: One or more computer-readable storage media storing instructions that, when executed by one or more processors, perform operations comprising: receiving sensor data of an environment captured by a sensor on a vehicle; determining, as first occlusion data and based at least in part on the sensor data, a region of the environment, a portion of the first occlusion data indicative of one or more of a corresponding portion of the region being occluded, visible, or occupied; receiving second occlusion data for at least a portion of an occluded region of the environment; and controlling the vehicle based at least in part on the first occlusion data and the second occlusion data.

P: The one or more computer-readable storage media of paragraph O, wherein the vehicle is a first vehicle, the operations further comprising sending a request from the first vehicle for the second occlusion data, the second occlusion data being associated with a second vehicle and received from the second vehicle.

Q: The one or more computer-readable storage media of paragraph P, the operations further comprising: evaluating a cost function based at least in part on the second occlusion data, wherein evaluating the cost function is based at least in part on a time associated with receiving the second occlusion data or a size of the portion relative to the occluded region included in the second occlusion data, and wherein controlling the vehicle is further based on evaluating the cost function.

R: The one or more computer-readable storage media of paragraph P or Q, the operations further comprising sending, to the second vehicle, an instruction to alter a trajectory of the second vehicle to increase a visibility of the at least the portion of the occluded region.

S: The one or more computer-readable storage media of any of claims O-R, the operations further comprising: combining the first occlusion data and the second occlusion data using one or more of a Kalman filter, sensor fusion, or a probability density function.

T: The one or more computer-readable storage media of paragraph S, wherein combining the first occlusion data and the second occlusion data reduces an uncertainty associated with the first occlusion data or the second occlusion data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data of an environment captured by a sensor on a first vehicle, the first vehicle being at a first location in the environment;
detecting, based at least in part on the sensor data, an object in the environment;
generating, based at least in part on the sensor data, a first occlusion grid associated with a region of the environment and comprising a plurality of individual occlusion fields, one or more individual occlusion fields of the plurality of individual occlusion fields indicative of an occluded region;
receiving a second occlusion grid associated with at least a portion of the occluded region from a second vehicle in the environment; and
controlling the first vehicle to traverse the environment based at least in part on the first occlusion grid and the second occlusion grid associated with the at least the portion of the occluded region.

2. The system of claim 1, wherein the second occlusion grid is received from the second vehicle at a second location, the operations further comprising sending a request from the first vehicle to the second vehicle for the second occlusion grid responsive to determining the occluded region.

3. The system of claim 1, the operations further comprising:
evaluating a cost function based at least in part on the first occlusion grid, wherein evaluating the cost function is based at least in part on a time associated with receiving the second occlusion grid or a size of the portion relative to the occluded region included in the second occlusion grid, and
wherein controlling the first vehicle is further based on evaluating the cost function.

4. The system of claim 1, the operations further comprising:
determining a first stop position for the first vehicle at a junction prior to receiving the second occlusion grid; and
determining a second stop position for the first vehicle at the junction based at least in part on the second occlusion grid,
wherein controlling the first vehicle to traverse the environment comprises controlling the first vehicle to stop at the second stop position.

5. The system of claim 1, the operations further comprising:
determining a first speed for the first vehicle to traverse the environment prior to receiving the second occlusion grid from the second vehicle; and
determining a second speed for the first vehicle to traverse the environment based at least in part on the second occlusion grid, the second speed being faster than the first speed, wherein controlling the first vehicle to traverse the environment comprises controlling the first vehicle to traverse the environment at the second speed.

6. The system of claim 1, wherein the second occlusion grid comprises a time stamp associated with a time that the second occlusion grid was generated.

7. A method comprising:
receiving sensor data of an environment captured by a sensor on a vehicle;
generating, based at least in part on the sensor data, a first occlusion grid associated with a region of the environment and comprising a plurality of individual occlusion fields, one or more individual occlusion fields of the plurality of individual occlusion fields indicative of a portion of the region being an occluded region;
receiving a second occlusion grid for at least a portion of the occluded region, wherein the second occlusion grid comprises a time stamp associated with a time that the second occlusion grid was generated; and
controlling the vehicle based at least in part on the first occlusion grid and the second occlusion grid associated with the at least the portion of the occluded region.

8. The method of claim 7, further comprising:
evaluating a cost function based at least in part on the second occlusion grid, wherein evaluating the cost function is based at least in part on the time stamp, and wherein controlling the vehicle is further based on evaluating the cost function.

9. The method of claim 7, wherein the vehicle is a first vehicle, the method further comprising receiving the second occlusion grid from a second vehicle in the environment.

10. The method of claim 9, further comprising sending, to the second vehicle, an instruction to alter a trajectory of the second vehicle in order to alter the at least the portion of the occluded region.

11. The method of claim 10, wherein the instruction to alter the trajectory comprises at least one of:
an instruction to change a position of the second vehicle within a lane,
an instruction to move the second vehicle from the lane to another lane, or
an instruction to change a speed of the second vehicle.

12. The method of claim 7, wherein the vehicle is located at a junction, and wherein controlling the vehicle comprises controlling the vehicle to traverse the junction based at least in part on the second occlusion grid for the at least the portion of the occluded region.

13. The method of claim 7, wherein the vehicle is located in a traffic lane, and wherein controlling the vehicle comprises controlling the vehicle to traverse the traffic lane or change to another traffic lane based at least in part on the second occlusion grid for the at least the portion of the occluded region.

14. The method of claim 7, wherein the vehicle is located proximate a construction zone, and wherein controlling the vehicle comprises controlling the vehicle to traverse the environment proximate the construction zone based at least in part on the second occlusion grid for the at least the portion of the occluded region.

15. One or more non-transitory computer-readable storage media storing instructions that, when executed by one or more processors, perform operations comprising:
receiving sensor data of an environment captured by a sensor on a vehicle;
generating, based at least in part on the sensor data, a first occlusion grid associated with a region of the environment and comprising a plurality of individual occlusion fields, one or more individual occlusion fields of the plurality of individual occlusion fields indicative of a portion of the region being an occluded region;
receiving a second occlusion grid for at least a portion of the occluded region, wherein the second occlusion grid comprises a time stamp associated with a time that the second occlusion grid was generated; and
controlling the vehicle based at least in part on the first occlusion grid and the second occlusion grid.

16. The one or more non-transitory computer-readable storage media of claim 15, wherein the vehicle is a first vehicle, the operations further comprising sending a request from the first vehicle for the second occlusion grid, the second occlusion grid being associated with a second vehicle and received from the second vehicle.

17. The one or more non-transitory computer-readable storage media of claim 16, the operations further comprising:
evaluating a cost function based at least in part on the second occlusion grid, wherein evaluating the cost function is based at least in part on a time associated with receiving the second occlusion grid or a size of the portion relative to the occluded region included in the second occlusion grid, and
wherein controlling the vehicle is further based on evaluating the cost function.

18. The one or more non-transitory computer-readable storage media of claim 16, the operations further comprising sending, to the second vehicle, an instruction to alter a trajectory of the second vehicle to increase a visibility of the at least the portion of the occluded region.

19. The one or more non-transitory computer-readable storage media of claim 15, the operations further comprising:
combining the first occlusion grid and the second occlusion grid using one or more of a Kalman filter, sensor fusion, or a probability density function.

20. The one or more non-transitory computer-readable storage media of claim 19, wherein combining the first occlusion grid and the second occlusion grid reduces an uncertainty associated with the first occlusion grid or the second occlusion grid.

21. The one or more non-transitory computer-readable storage media of claim 15, wherein:
the first occlusion grid and the second occlusion grid are generated at differing times and based on differing perspectives of the environment, and
controlling the vehicle comprises generating a combined occlusion grid having a perspective of the environment based on combining the differing perspectives of the first occlusion grid and the second occlusion grid.

\* \* \* \* \*